Sept. 23, 1958  S. J. CABLE  2,852,932
TILE AND GROUTING ASSEMBLY
Filed March 26, 1957  2 Sheets-Sheet 1
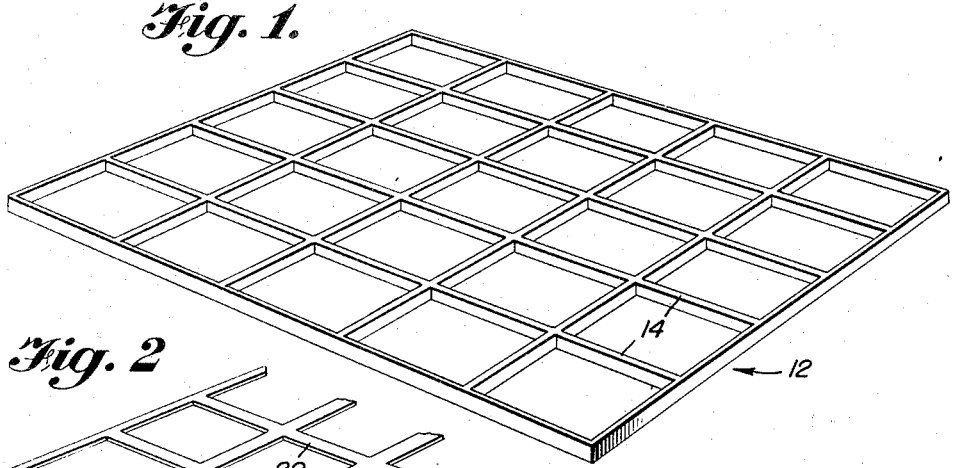
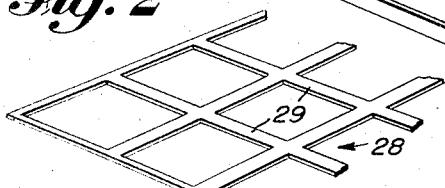
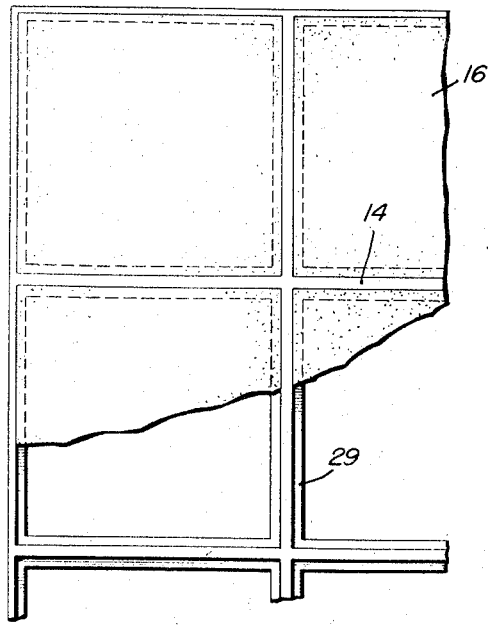
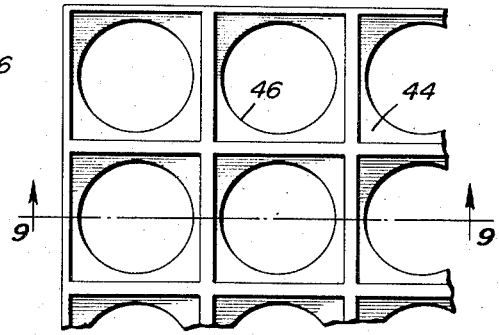
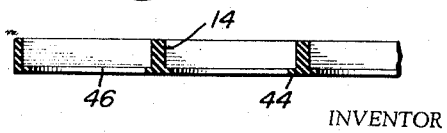
INVENTOR
Stephen J. Cable
BY Diggins & LeBlanc
ATTORNEYS

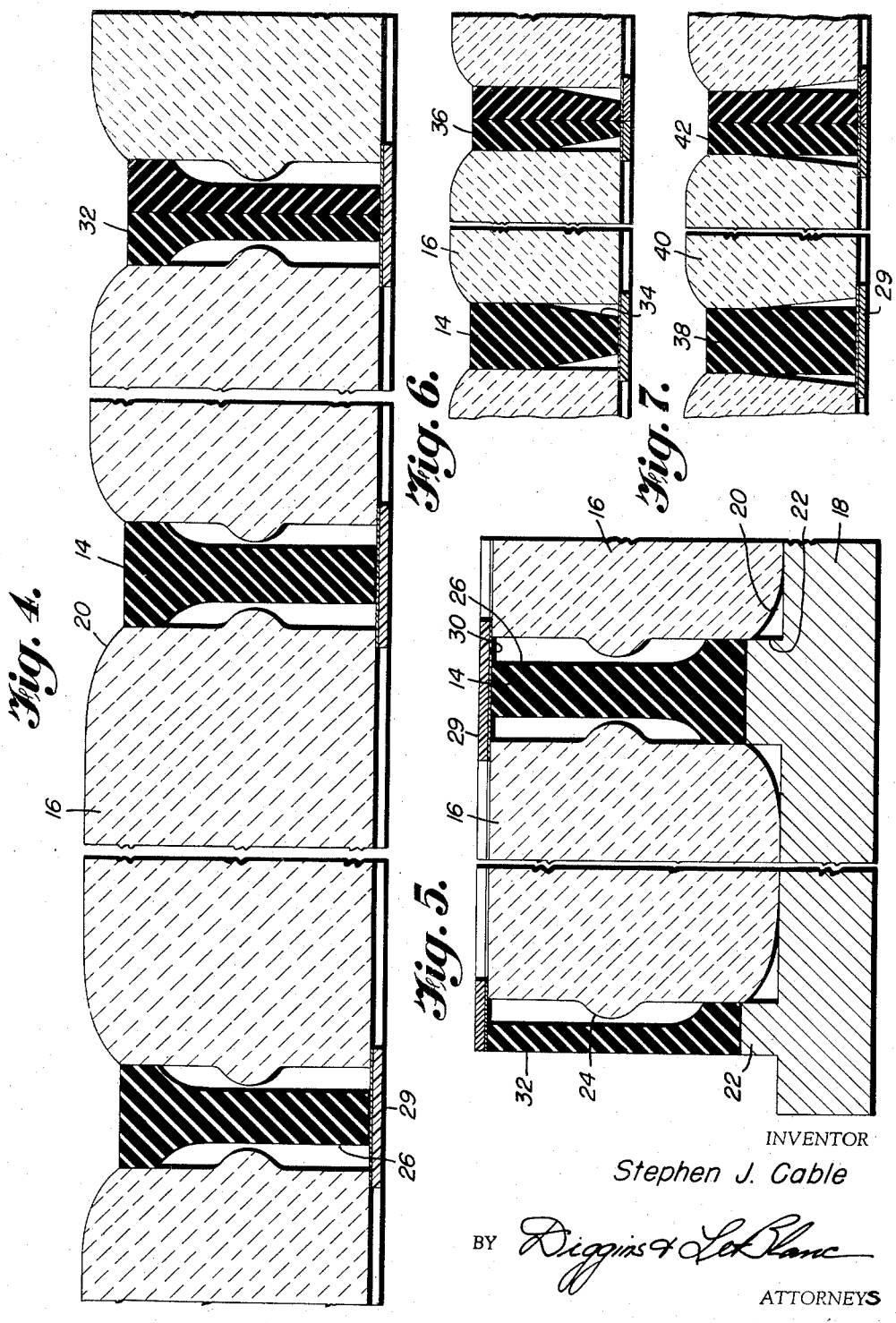

United States Patent Office 2,852,932
Patented Sept. 23, 1958

2,852,932
TILE AND GROUTING ASSEMBLY

Stephen J. Cable, East Sparta, Ohio, assignor to United States Ceramic Tile Company, Canton, Ohio, a corporation of Delaware Application March 26, 1957, Serial No. 648,571

7 Claims. (Cl. 72—24)

The present invention relates to a novel method and apparatus for handling and setting ceramic tile or the like.

Ceramic tile has long been used for the surfacing of walls, floors and the like, and its advantage of permanent brilliancy of color, wear resistance, high gloss and ease of cleaning are well known. The tile itself is relatively inexpensive but because of the difficulties involved in properly applying such tile, its use has been sharply limited. The use of soft tiles of rubber, vinyl plastic, asphalt and the like have far exceeded the use of ceramic tile due entirely to the fact that such soft tile may be installed at substantially less expense and with less skilled labor. In many areas, the setting of ceramic tile has been further limited by the fact that only a relatively few skilled artisans are capable of applying ceramic tile in a satisfactory fashion so that even apart from cost, the use and application of ceramic tile has been very sharply restricted.

One of the principal factors which restricts the use and application of ceramic tile, increases the expense of application, and limits the application to skilled artisans is the step of grouting, that is, the application of a thin, uniform and attractive line of cement or plaster between adjacent tiles. According to modern methods of manufacturing ceramic tile, the tiles are spaced in a template or frame with the outer face up. A sheet of paper or similar material is pasted or glued to the outer faces of the tiles, the paper and tiles are removed from the frame with the tiles in properly spaced relation and the sheets are packed for shipment from the factory.

At the point of installation, the floor or wall to be surfaced is properly coated with cement or adhesive by the tile mechanic and the tiles still adhering to the paper are placed with their backs in contact with the cement or other adhesive, and the cement is permitted to harden. The paper is then removed, leaving the tiles adhering to the floor or wall in spaced relation to each other. Ordinarily, this free space between tiles is about 1/16 to 1/8 of an inch.

The spaces between the tiles are then filled by the tile mechanic with the grouting material and the grouting material is worked into the spaces until it is at the proper level between adjacent tiles. The excess grouting material is then removed from the face of the tile after initial hardening of the grout and the wall or floor is complete.

There are numerous difficulties in this grouting step which require a high degree of skill and experience. First, working the grout to fill the spaces between adjacent tiles without air bubbles requires skill and patience. Second, the moisture conditions of the tiles, the grout and the atmosphere all affect the nature of the final grout and unless conditions are proper, the grout will become powdery and flake out from between the tiles. Finally, the cleaning of the tiles after grouting is a long and laborious task requiring repeated cleaning operations. Even after the setting and grouting of ceramic tiles has been done in the most skillful fashion, the final product has certain inherent limitations. The grouting material is normally rigid with little or no resilience so that if there is any movement of the sub-floor or wall on which the tile is installed, the grouting will tend to crack and powder leaving unsightly cracks and spaces between adjacent tiles.

I have found that all of these difficulties can be overcome and that ceramic tile may be set with neat, sharp grouting between adjacent tiles. This can be accomplished simply, quickly and without the necessity of employing highly skilled labor. According to the present invention, ceramic tile may now be applied in much the same manner as soft tile and may even be applied satisfactorily by amateurs.

One of the objects of the present invention is to provide a novel method of applying ceramic tile with preformed grouting between adjacent tiles.

Another object is to provide a method of simultaneously applying tiles and grouting to a surface.

Another object is to provide a grouting lattice for ceramic tiles.

Another object is to provide ceramic tiles with flexible grouting.

Another object is to provide a pre-fabricated tile and grout assembly which may be assembled at the factory.

Another object is to provide a tile grouting which will withstand limited movement of the surface to which the tile is applied and adjust to slight irregularities in sub-floor surface.

These and other objects reside in certain novel features of construction and arrangement and in steps and process as will hereinafter be more fully set forth and pointed out in the appended claims.

Referring to the drawings:

Figure 1 is a perspective view of one form of grouting lattice according to the present invention;

Figure 2 is a perspective view of a backing member for the grouting lattice of Figure 1;

Figure 3 is a fragmentary plan view of a ceramic tile and grout assembly according to the present invention;

Figure 4 is a vertical section of one form of tile and grout assembly according to the present invention;

Figure 5 is a vertical sectional view illustrating the assembling of the tile and grout;

Figure 6 is a vertical section of a modified form of tile and grout assembly;

Figure 7 is a vertical section of a further modified form of tile and grout assembly;

Figure 8 is a fragmentary plan view of a modified form of grout member;

Figure 9 is a section taken along lines 9—9 of Figure 8.

Generally speaking, the present invention consists in providing a frame or lattice 12 of suitable flexible material such as rubber, vinyl plastic and other suitable elastomers or polymers as shown in Figure 1. This material should be water resistant and resistant to decay, rot, insects and the like, and a wide variety of materials meeting these conditions may be used. The lattice 12 is polymerized or vulcanized prior to use and it should be sufficiently flexible so that the sheet of ceramic tile and grouting lattice will withstand handling and shipment.

For purposes of illustration, the lattices shown in the drawing are adapted for use with square tiles but these lattices can be made for any shape tile, square, hexagonal, circular, rectangular or other shape.

The lattice 12 is formed of a plurality of walls 14 defining a plurality of openings each of a size and shape to receive a single tile. Preferably, the openings are slightly smaller than the tiles so that the resilient plastic walls 14 are slightly compressed when the tiles 16 are in position as shown in Figure 3. Figure 3 also shows how the walls 14 of the lattice define neat and uniform grout lines between adjacent tiles.

Referring now to Figure 5, the tile and grouting lattice are assembled in the factory on a board or template 18. When the tiles 16 are formed with bevelled or curved edges 20, known in the trade as "cushion" edges, the template 18 is formed with raised spaced dividers 22 which correspond to the size and shape of the tiles 16 and the walls 14 of the grouting lattice. When a grouting lattice of the form shown in Figure 1 is to be used, the raised dividers 22 would correspond in size and shape to the square compartments of the grouting lattice and the height of these dividers would correspond substantially to the amount of curve or bevel 20 at the edge of the tile 16.

The grouting lattice is positioned in alignment on the raised dividers and the tiles are pressed into the compartments face down until the face contacts the surface of the template 18.

In the production of some types of ceramic tiles, such as glazed tiles, it is inevitable that the tile is inherently formed with ridges 24 which extend along the sides of the tile. In order to give clearance for such a ridged tile, the walls 14 of the grouting lattice are recessed as indicated at 26 in Figures 4 and 5. The walls 14 of the grouting lattice are the same depth as the thickness of the tile from the cushion edge 20 to the backface of the tile and after the tiles have been placed in the grouting lattice, a sheet 28 of suitable material is coated with adhesive 30 and placed on the tile and grouting. Ordinarily this sheet 28 would be of the same material as the grouting lattice itself and various suitable adhesives could be used. For example, when the grouting lattice and sheet are of vinyl plastic, polyvinyl acetate has been found to be a very satisfactory adhesive.

In order to save material, the sheet is normally cut into a grid as shown in Figure 2 and the strips 29 forming this grid are wide enough to cover the space between adjacent tiles and overlap the edges of the adjacent tiles. The adhesive binds the sheet to the tiles and the lattice, and sometimes it is advantageous to use an excess of cement so that it extends upward between the tile 16 and the wall 14 of the grouting lattice for some distance. The completed assembly is shown in position on the template in Figure 5.

The cement 30 is permitted to harden and if desired the assembly may be heated to accellerate hardening of the cement. The composite tile and grouting lattice may then be handled in much the same manner as the tile and paper assembly normally used. The composite tile and grouting sheets may be of various sizes and sheets 12 by 12 inches square have been found to be satisfactory.

As best shown at 32 in Figures 4 and 5, the peripheral wall of each complete grouting lattice is only half the thickness of the walls 14 so that when two adjacent lattices are placed together on the floor or other surface, the grouting wall between the adjacent lattices will be of the same thickness as the other grouting walls. This results in a tile surface of uniform and attractive apperance.

In applying the composite sheets of the present invention, the floor or wall is preferably coated with a suitable cement or adhesive in the same manner as in the case of conventional tile. A composite tile and grouting lattice assembly is then positioned with its back surface on the cement or adhesive and is secured in position. The cement adheres to the exposed rear surface of the tiles 16 so that the assembly is locked into position. The floor or other surface is then complete without the necessity of hand grouting and the resulting appearance is more uniform and attractive than can be obtained by hand grouting. Nothing more than normal cleaning is required to finish the surface.

Referring to Figure 6, the walls 14 of the grouting lattice may be given a flat taper as indicated at 34 to facilitate insertion of the tiles 16 and the peripheral walls of each assembly would be of half thickness as indicated at 36 for the reasons pointed out above.

Figure 7 shows a further modified form of tile and lattice which eliminates the need for a template provided with dividers for positioning the grouting lattice. In the embodiment shown in Figure 7, the walls of the grouting lattice are substantially straight as indicated at 38 and the tiles 40 are given slight taper from the cushion edge back to the rear surface. In this embodiment the sheet 28 could be first coated with adhesive and placed on a flat surface with the coated surface facing upward. The lattice would then be positioned on the sheet while the adhesive was still tacky and the tiles 40 pressed into place. The adhesive would be hardened with the tiles and lattice in the position shown in Figure 7. Of course, lattice and backing sheet could also be molded in one piece. As in the embodiments of Figures 4, 5 and 6 the peripheral wall 42 is of half thickness so as to maintain the uniformity of grouting thickness between adjacent tile and grout assemblies.

Figures 8 and 9 show a further modified form of grouting lattice. In this form the grouting lattice is provided with an integral backing sheet 44 having one or more apertures 46 within each compartment of the lattice. The tiles face outward as in Figure 7, but it is not necessary in this modification that the tiles be cemented in the compartment. When the tile and lattice assembly of Figures 8 and 9 is secured to the floor or other surface, the usual cement extends through the openings 46 and adheres to the tile thus mechanically locking the tile and grouting assembly in position. Of course a cement may be used which will adhere to both the tile and grouting lattice but this is not essential since adhering to the tile alone will securely lock the lattice in position.

For some installations and under some circumstances it may be desirable to have the back face of the tile and grouting assembly completely covered by a continuous sheet rather than the grid 28 of Figure 2 or a perforated sheet such as sheet 44 of Figures 8 and 9. Such a continuous sheet falls within the scope of the present invention, but when the sheet is continuous, the adhesive used is preferably and adhesive which contains no volatile solvents or other volatile constituents. This is desirable because the fit of the tile in its compartment in the grouting lattice is sufficiently tight that solvent vapors may be entrapped which would delay or prevent curing of the adhesive. Epoxy resins containing 100% solids are suitable adhesives for this purpose.

When a continuous sheet is used on the back of such a tile and grouting lattice assembly, the cement used to secure the assembly to the floor or other surface would, of course, be a cement which would adhere to the continuous sheet rather than a conventional tile cement.

Figures 4, 5, 6 and 7 of the drawing all show tile with a bevelled or "cushion" edge but it is obvious that the present invention is equally applicable to flat tiles which do not have this "cushion" edge. When such flat tiles are used, the walls 14 of the grouting lattice would be of substantially the same height as the thickness of the tile.

One of the principal features of the present invention is that the steps of assembling the tile and grouting lattice are similar to the process presently used for forming tile assemblies on adhesive coated paper. Thus the same or substantially similar equipment may be used and it is unnecessary to teach workers new and different techniques.

The greatest advantage of the present invention is in the setting or installation of the tile and grouting assemblies. The time, patience and skill heretofore required for grouting and cleaning is eliminated and the resulting tile surface has a uniformity or symmetry of appearance which is almost unattainable by hand grouting methods. Further, the present invention simplifies the setting of ceramic tile to such an extent that ceramic tile can be set by anyone who can set soft tile or can be set even by amateurs.

When a tile and grouting assembly of the present invention is too large for a particular area, that is, when the standard size of tile and grouting assembly is too large to fit in the permissible space, the excess rows of ceramic tiles can be removed from the assembly and the plastic grouting lattice can be trimmed to the proper size with a knife or scissors. If partial tiles are needed to fill the vacant spaces in the grouting, these can be cut or broken by conventional, known techinques.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A ceramic tile and grouting assembly detached and separate for packaging and shipping and adapted to be cemented as a unit to a surface, said assembly comprising a lattice of flexible resilient material, said lattice including a plurality of intersecting walls forming a plurality of compartments therebetween, a backing sheet secured to said lattice and having a plurality of apertures formed therein opposite each said compartment, the area of said apertures being sufficiently large for the passage of cement but less than the area of said compartments, and a plurality of ceramic tiles positioned in said compartments and adhesively secured to said lattice walls and said backing sheet.

2. A ceramic tile and grouting assembly as set forth in claim 1 wherein said backing sheet has one aperture opposite each said compartment, the area of each said aperture being greater than half the area of each said compartment.

3. A ceramic tile and grouting assembly as set forth in claim 1 wherein said backing sheet is integral with said lattice.

4. A ceramic tile and grouting assembly as set forth in claim 1 wherein said backing sheet is separate from said lattice and adhesively secured thereto.

5. A ceramic tile assembly as set forth in claim 1 wherein said lattice walls are tapered to facilitate insertion of the tiles.

6. A ceramic tile and grouting assembly detached and separate for packaging and shipping and adapted to be cemented as a unit to a surface, said assembly comprising a lattice of flexible resilient material, said lattice including a plurality of intersecting vertical walls forming a plurality of compartments therebetween, a backing sheet of flexible resilient material adhesively secured to the lower surface of said lattice and having a plurality of apertures formed therein opposite each said compartment, the area of said apertures being less than the area of said compartments, said lattice walls having recesses formed in the vertical sides thereof, said recesses being spaced from the upper surfaces of said lattice walls, and a plurality of ceramic tiles positioned in said compartments and adhesively secured to said lattice walls and said backing sheet, said ceramic tiles having ridges formed thereon extending into said recesses in said lattice walls.

7. A detached and separate pre-grouted tile assembly suitable for packaging and shipping and suitable for adherence to a surface as a pre-grouted unit, said assembly comprising a lattice of resilient flexible material, said lattice including a plurality of interesecting peripheral and inner walls forming a plurality of compartments therebetween, and a plurality of ceramic tiles positioned in said compartments and adhesively secured to said lattice walls, the top surfaces of said tiles being exposed and separated by said walls which serve as a grout, and at least a portion of the bottom surfaces of said tiles being exposed to permit securement of said assembly to a surface by means of an adhesive which contacts at least portions of the bottom surfaces of said tiles.

References Cited in the file of this patent

UNITED STATES PATENTS

| | | |
|---|---|---|
| 392,902 | Blakeney | Nov. 13, 1888 |
| 636,200 | Frink | Oct. 31, 1899 |
| 712,168 | Worth | Oct. 28, 1902 |
| 750,954 | Ellis | Feb. 2, 1904 |
| 984,637 | Alcan | Feb. 21, 1911 |
| 1,704,035 | Cochran | Mar. 5, 1929 |
| 2,049,427 | Denk | Aug. 4, 1936 |
| 2,114,710 | Holcomb | Apr. 19, 1938 |
| 2,346,304 | Henderson et al. | Apr. 11, 1944 |